July 15, 1924.
D. C. BROCKMAN
VEHICLE DIRECTION INDICATOR
Filed March 17, 1924
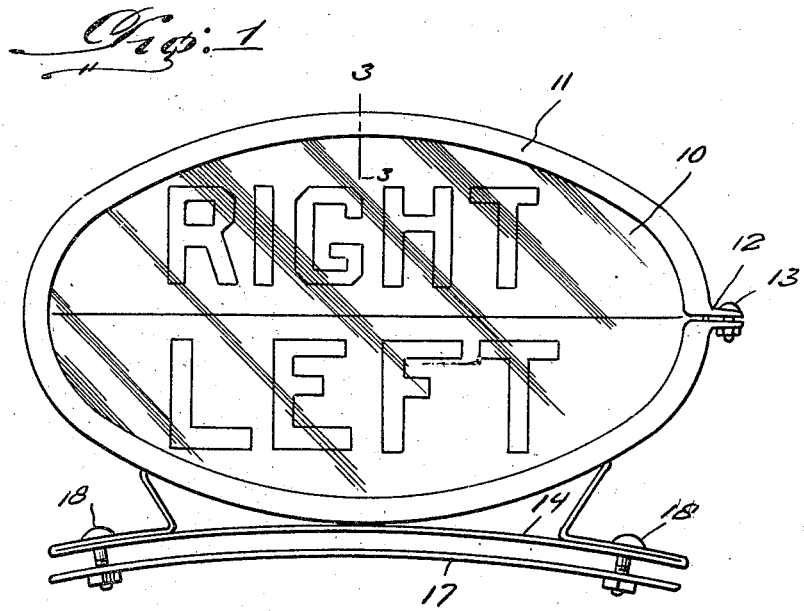
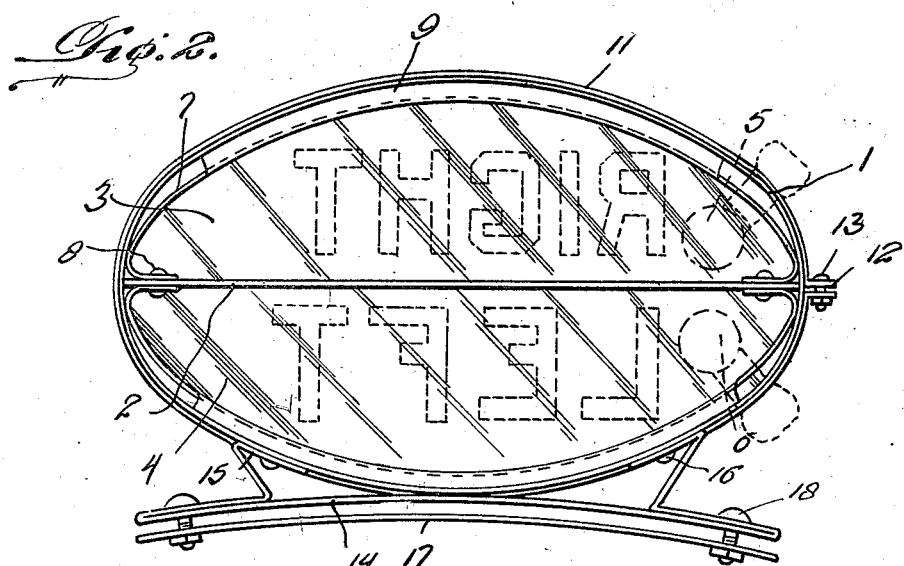
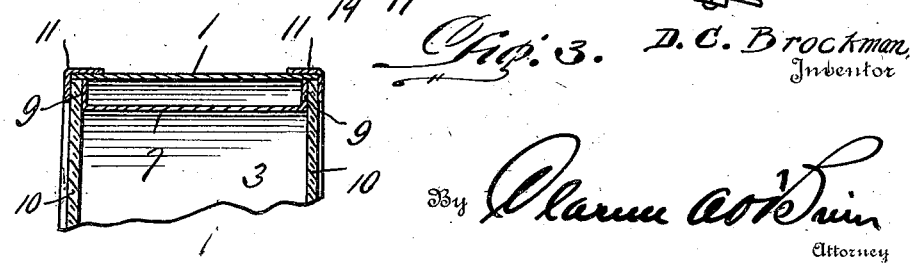

Patented July 15, 1924.

1,501,198

UNITED STATES PATENT OFFICE.

DANIEL CHARLES BROCKMAN, OF PHIPPSBURG, COLORADO, ASSIGNOR OF ONE-HALF TO JAMES L. WHITELEY, OF PHIPPSBURG, COLORADO.

VEHICLE DIRECTION INDICATOR.

Application filed March 17, 1924. Serial No. 699,878.

*To all whom it may concern:*

Be it known that I, DANIEL CHARLES BROCKMAN, a citizen of the United States, residing at Phippsburg, in the county of Routt and State of Colorado, have invented certain new and useful Improvements in Vehicle Direction Indicators, of which the following is a specification.

This invention relates to new and useful improvements in vehicle direction indicators, more particularly adapted for use on motor vehicles and has for its principal object to provide a simple and efficient means whereby the direction of the course of travel of the motor vehicle upon which the device is attached may be readily ascertained by pursuing vehicles.

A further object of the invention is to provide a vehicle direction indicator of the above mentioned character, which includes means for indicating the direction which an automobile is about to follow, the construction of the device being such as to enable the same to be visible either from the front or rear, thus avoiding any possibility of confusion when the signal is in operation.

A further object of the invention is to provide a vehicle direction indicator of the above mentioned character which is simple in construction, inexpensive, strong and durable, and further well adapted for the purposes for which it is designated.

Other objects and advantages of this invention will become apparent during the course of the following description.

In the accompanying drawing forming a part of the specification, and in which like numerals designate like parts throughout the same:—

Figure 1 is a front elevation of my improved vehicle direction indicator.

Figure 2 is a similar view with one of the signal plates and the retaining member therefor removed.

Figure 3 is a vertical section taken on line 3—3 of Figure 1.

In the drawing wherein for the purpose of illustration is shown the preferred embodiment of my invention, the numeral 1 designates a substantially elliptical shaped frame which is open at its front and back respectively. Extending longitudinally through the central portion of the casing 1 is the partition 2. The partition has its side edges spaced inwardly from the outer edges of the frame 1 for the purpose hereinafter to be more fully described. The partition 2 furthermore provides an upper compartment 3 and a lower compartment 4 in which are adapted to be mounted in any well known manner the signal lamps 5 and 6 respectively, for illuminating each compartment independently of each other. Any suitable means may be provided upon the vehicle within easy access to the driver thereof for controlling the lighting of the signal lamps 5 and 6 respectively. As this construction is well known in the art, it is not thought necessary to further go in detail relative to the same.

Arranged in each of the compartments 3 and 4 is the signal plate supporting means and the same comprises a substantially semi-elliptical shaped band 7 which has its outer end disposed inwardly to engage the partition 2 and the ends of the bands are secured together to the partition 2 by any suitable fastening means such as is shown at 8 in the drawing. Each of the semi-elliptical bands has its side edges terminating in the upstanding flanges 9 in the manner as clearly shown in Figure 3 of the drawing and the flanges formed on the side edges of each of the bands 7 extend upwardly into engagement with the inner wall of the elliptical casing or frame 1, it being understood of course that the band 7 is of a width less than the width of the casing and is of substantially the same width as the partition 2 so as to be in alinement therewith for the purposes to be presently described.

Adapted to be supported in each of the front and back openings of the casing 1, is the signal plate 10. Each signal plate is preferably formed of glass and has the indicating indicia printed thereon in any suitable manner. Each signal plate 10 is further provided with the words "Right" and "Left" thereon in such a manner as to have the word "Right" printed or otherwise formed on the upper portion and the word "Left" arranged on the lower portion, the portion of the plate on which the word "Right" is formed being of a different color from that upon which the word "Left" is formed so as to readily distinguish the two. Each signal member is also of substantially the same shape as the frame 1 and when in position thereon will have its inner face engaging the flanged portions 9 of the bands 7 and the side edges of the partition 2 whereby the same will be supported in a proper vertical position within the casing.

For the purpose of retaining the signal plate in position within the casing 1, I provide the retaining members 11 which are in the form of elliptical shaped bands and are also angular in cross section as clearly shown in Figure 3 of the drawing whereby one of the flanged portions of the band 11 will engage the outer face of the signal member 10 at its outer edges and the other flange of each band 11 will engage the outer peripheral edge of the casing 1, in the manner as clearly shown in Figure 3 of the drawing. The ends of each retaining member 11 extend outwardly as shown at 12 in the drawing and a suitable fastening means such as is shown at 13 is adapted to extend therethrough whereby each retaining member may be removably secured in position with respect to the casing.

For the purpose of mounting my vehicle direction indicator in any desired position on the vehicle, preferably the fender thereof, I provide the securing means which comprises the plate 14, the ends of which are bent back upon the strip or plate and are then directed upwardly and inwardly as shown at 15 in the drawing for cooperation with the bottom of the casing 1 and any suitable fastening means such as is illustrated at 16 is adapted to extend through the inwardly extending portions of the ends of the plate 14 for securing the same to the casing. The plate 14 is of substantially the same shape as the fender of the vehicle upon which the same is to be attached and cooperating therewith is an additional plate 17 which is adapted to be positioned beneath the fender and the ends of the plates 14 and 17 are provided with suitable registering apertures to which are adapted to extend the fastening bolts 18 whereby a means is provided for securing the plates and vehicle direction indicator carried thereby on the vehicle fender.

By constructing a vehicle direction indicator of the above mentioned character, in a substantially elliptical shape, there will be no possibility of the signal plates from moving around in the casing and furthermore by providing signal plates in the front and rear open faces of the frame, the signal may be visible from both the front and rear of the vehicle upon which the device is mounted.

The simplicity of my device enables the same to be readily disassembled whenever necessary and furthermore in providing a partition between the upper and lower portions of the frame, the proper signal may be given without causing any confusion as to the direction in which the automobile upon which the signal is mounted is to pursue.

Furthermore, the illuminating means of each of the compartments is controlled independently so as not to accidentally light both of the compartments simultaneously and which would ordinarily cause confusion and sometimes result in a serious accident.

While I have shown the preferred embodiment of my invention, it is to be understood that various changes in the size, shape and arrangement of parts may be resorted without departing from the spirit of the invention and the scope of the appended claims.

Having thus described my invention, what I claim is:

1. A vehicle direction indicator comprising a substantially elliptical shaped casing open at its front and back respectively, a partition extending longitudinally through the center thereof providing a pair of compartments, a substantially semi-elliptical shaped band arranged in each compartment, said band having its side edges extending inwardly from the edges of the casing forming a support, signal plates arranged in the front and back openings of said casing and resting against the side edges of said semi-elliptical band, and means removably supported on said casing for engaging the outer edges of the same and said signal plates.

2. A vehicle direction indicator comprising a substantially elliptical shaped casing open at its front and back respectively, a partition extending longitudinally through the center thereof providing a pair of compartments, said partition being of less width than the width of said casing, a substantially semi-elliptical shaped band secured at its free end to said partition and extending in close proximity to the inner walls of said casing, each band being of substantially the same width as the partition and having flanges formed on the side edges thereof, supporting signal plates supported in the front and back openings of said casing respectively against the flanges of said bands and the side edges of said partition, and retaining members removably supported on said casing and adapted to engage the outer edges of said casing and said signal plates for holding the latter in position therein, and signal lamps for each of said compartments.

3. A vehicle direction indicator comprising a substantially elliptical shaped casing open at its front and back respectively, a partition extending longitudinally through the center thereof providing a pair of compartments, said partition being of less width than the width of said casing, a substantially semi-elliptical shaped band secured at its free end to said partition and extending in close proximity to the inner walls of said casing, each band being of substantially the same width as the partition and having flanges formed on the side edges thereof, supporting signal plates supported in the front and back openings of said casing respectively against the flanges of said bands and the side edges of said partition, and retaining members removably supported on said casing and adapted to engage the outer edges of said casing and said signal plates for holding the latter in position therein, and signal lamps for each of said compartments, and means for detachably supporting the casing on a motor vehicle.

In testimony whereof I affix my signature.

DANIEL CHARLES BROCKMAN.